United States Patent
Hoskins et al.

(10) Patent No.: US 11,789,540 B1
(45) Date of Patent: Oct. 17, 2023

(54) TOUCH SURFACE CONTROLLER

(71) Applicant: Kostal of America, Inc., Troy, MI (US)

(72) Inventors: Steven R. Hoskins, Wolverine Lake, MI (US); Xiaozhong Duan, Troy, MI (US); Kenneth S. Koscielniak, Farmington Hills, MI (US)

(73) Assignee: Kostal of America, Inc., Troy, MI (US)

( * ) Notice: Subject to any disclaimer, the term of this patent is extended or adjusted under 35 U.S.C. 154(b) by 0 days.

(21) Appl. No.: 17/993,424

(22) Filed: Nov. 23, 2022

(51) Int. Cl.
*G06F 3/01* (2006.01)
*G06F 3/0488* (2022.01)
*G06F 3/041* (2006.01)

(52) U.S. Cl.
CPC ............ *G06F 3/016* (2013.01); *G06F 3/0416* (2013.01); *G06F 3/0488* (2013.01); *G06F 3/04142* (2019.05); *G06F 2203/04809* (2013.01)

(58) Field of Classification Search
CPC .... G06F 3/016; G06F 3/04142; G06F 3/0416; G06F 3/0488; G06F 2203/04809; G06F 3/033; G06F 3/03543
See application file for complete search history.

(56) References Cited

U.S. PATENT DOCUMENTS

| | | | |
|---|---|---|---|
| 6,681,880 B2 | 1/2004 | Bernhardt et al. | |
| 7,516,675 B2 | 4/2009 | Kurtz et al. | |
| 9,761,094 B2 | 9/2017 | Mariogny | |
| 10,331,239 B2 | 6/2019 | Grant et al. | |
| 2015/0177899 A1 | 6/2015 | Degner et al. | |
| 2017/0177152 A1* | 6/2017 | Sato | G06F 1/1643 |
| 2020/0348757 A1 | 11/2020 | Forest et al. | |
| 2020/0396322 A1* | 12/2020 | Park | H04M 1/0266 |

* cited by examiner

*Primary Examiner* — Temesghen Ghebretinsae
*Assistant Examiner* — Ivelisse Martinez Quiles
(74) *Attorney, Agent, or Firm* — Gunther Evanina; BUTZEL LONG

(57) ABSTRACT

A haptic controller includes a conventional user interface having a plurality of touch surfaces, a shaped strain plate having a plurality of strain surfaces, each strain surface corresponding with one of the plurality of touch surfaces, a strain gauge mounted on each of the plurality of strain surfaces and a microcontroller electrically connected with the strain gauges.

6 Claims, 6 Drawing Sheets

TOUCH SURFACE CONTROLLER

FIELD OF THE DISCLOSURE

Disclosed is a user-interface for generating control signals or user input that is provided to a processor, and more particularly to a haptic controller that allows a user to generate control signals using simple gestures based on the sense of touch.

BACKGROUND OF THE DISCLOSURE

Conventional touch switch surfaces rely on capacitive touch sensors that can easily generate unintended control signals and operations when the surface is accidently touched or bumped. Attempts to remedy this problem have generally involved use of capacitive sensors in combination with leaf springs, analog Hall sensors, magnets, force-sensing resistors, or digital strain gauges.

SUMMARY OF THE DISCLOSURE

A haptic controller is disclosed that can be operated to generate user selected control signals using simple gestures on a contoured user interface without needing to look at the controller, i.e., the gestures are easily performed on the controller using only the sense of touch.

The haptic controller includes a contoured user interface having a top surface and at least two pairs of generally parallel opposing side touch surfaces (e.g., a total of four side touch surfaces). Each side touch surface is arranged at a positive angle with respect to an adjacent side touch surface (e.g., about 90 degrees). A shaped strain plate having a plurality of strain surfaces, each of which corresponds with one of the side touch surfaces is either integrally formed with the user interface or attached to the user interface. The strain surfaces are positioned in relation to the corresponding side touch surface so that pressure (or force) applied to a side touch surface causes strain on the corresponding strain surface. A strain gage is mounted on each of the plurality of strain surfaces, and each strain gage is electrically connected to a microcontroller.

In certain embodiments, the haptic controller includes a top strain surface corresponding with the top surface of the user-interface, and which is located in relation to the top surface so that pressure applied to the top surface causes strain on the top strain surface. At least one strain gage is mounted on the top strain surface and electrically connected to the microcontroller.

DETAILED DESCRIPTION OF THE EMBODIMENTS

Figure 1:
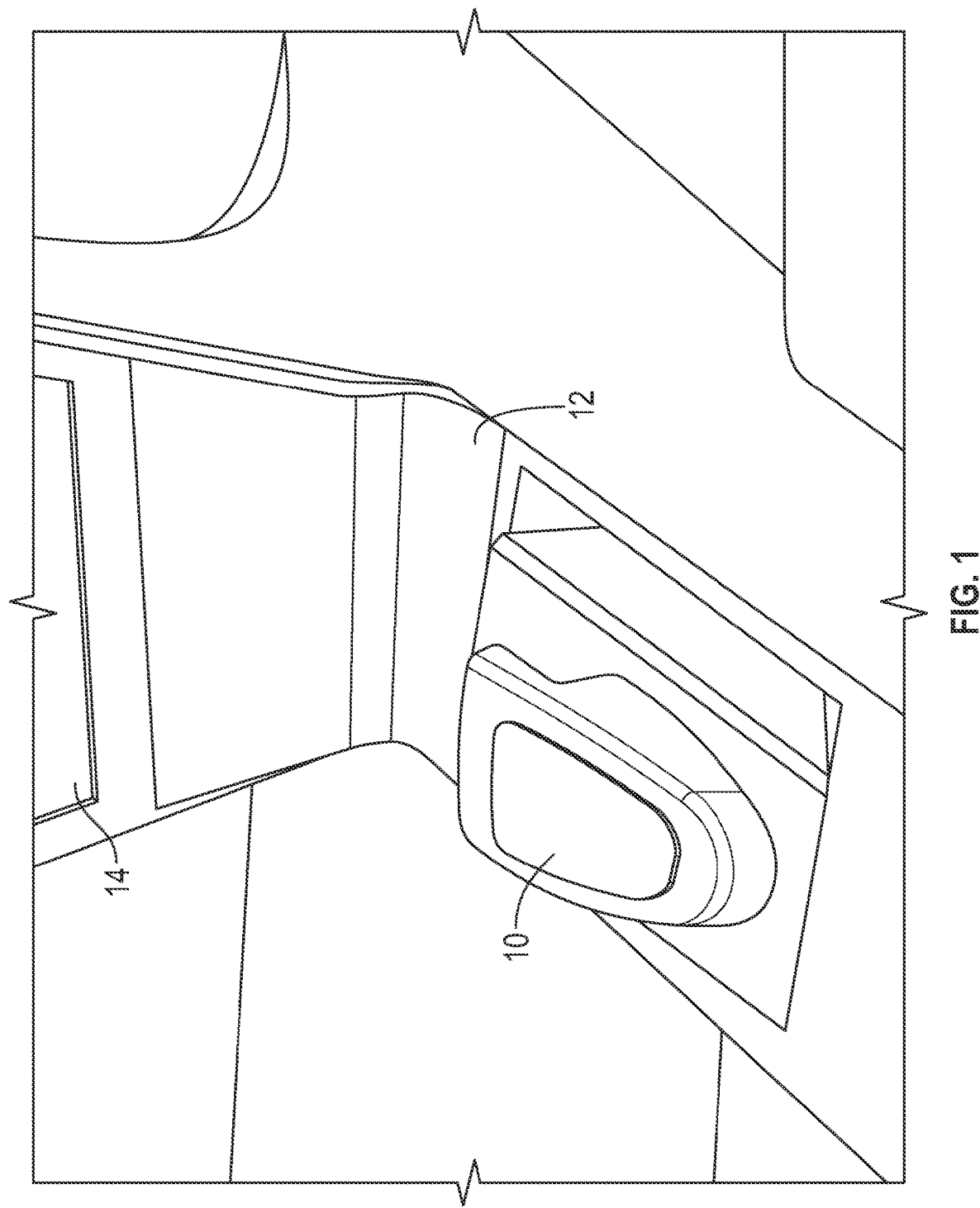
FIG. 1 is a perspective view of a haptic controller located on a center console of a vehicle.

Shown in FIG. 1 is an automotive environment in which the disclosed haptic controller 10 may be used. Specifically, haptic controller 10 can be located on a vehicle center console 12 below a vehicle interface screen 14. Alternatively, or additionally, a similar haptic controller 10 may be located on a vehicle armrest, dashboard, or other location. Although haptic controller 10 is particularly useful in vehicle applications where drivers need to be focused on the road and wish to be able to adjust vehicle settings using only their sense of touch, it can also have other applications, such as a user interface for computer gaming.

Figure 2:
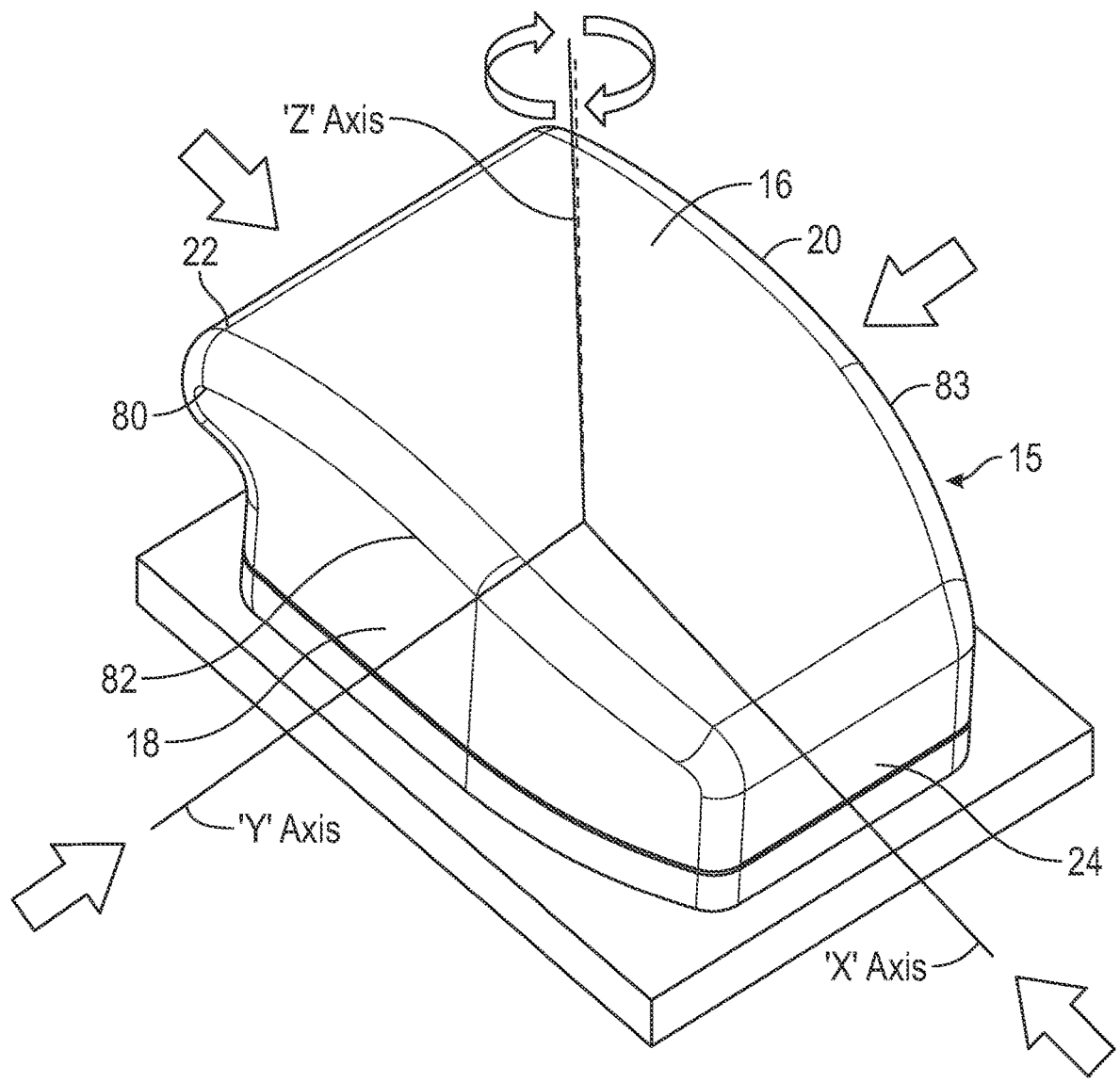
FIG. 2 is an enlarged perspective view of the controller.

An enlarged perspective view of haptic controller 10 is shown in FIG. 2. Haptic controller 10 has a contoured user interface 15 including a top touch surface 16, a pair of opposing side touch surfaces 18 and 20 (left and right side surfaces respectively), and a second pair of opposing side touch surfaces 22 and 24 (front and rear side surfaces respectively). Touch surfaces 18 and 20 are generally parallel with each other and generally perpendicular with touch surfaces 22 and 24 (which are generally parallel with each other).

Figure 3:
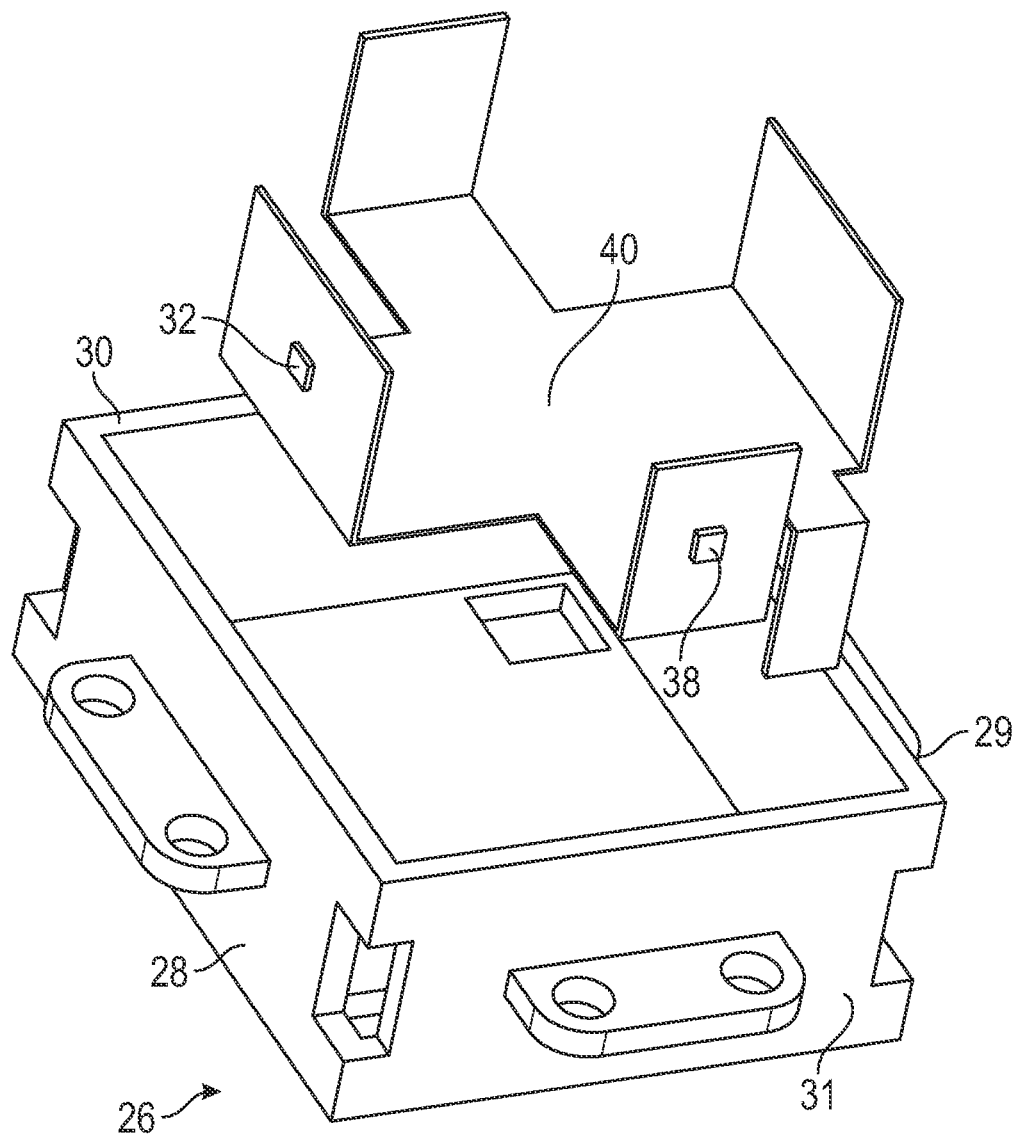
FIG. 3 is a perspective view of a shaped strain plate, strain gauges and flexible printed circuit board used in the controller.

Contained within a volume defined by the touch surfaces of the user interface is a shaped strain plate 26, as shown in FIG. 3. Strain plate 26 has a plurality of strain surfaces (or walls) 28, 29, 30 and 31, which each correspond (i.e., are associated) with one of the touch surfaces (18, 20, 22 and 24, respectively). In the illustrated embodiments there are only two pairs of side touch surfaces and two pairs of corresponding strain surfaces (i.e., a total of four side touch surfaces and four strain surfaces). However, it is possible to employ, for example, three or four pairs of generally parallel side touch surfaces arranged to form a contoured user interface having a hexagonal or octagonal shaped profile. A greater number of touch surfaces provides a greater number of functional commands from a single user gestures (such as applying pressure to a side of the haptic controller or applying a rotational torque to the haptic controller along an axis through the haptic controller).

In the illustrated embodiment, the two pairs of opposing side touch surfaces are approximately perpendicular (i.e., arranged at about a 90 degree angle relative to one another). When three or four pairs of opposing side touch surfaces are employed, each pair of opposing side touch surfaces can be arranged at a different positive angle with respect to another pair of opposing side touch surfaces (e.g., about 120 degrees between adjacent side touch surfaces of a hexagonal-shaped controller, and about 135 degrees between adjacent side touch surfaces of an octagonal-shaped controller).

Figure 4:
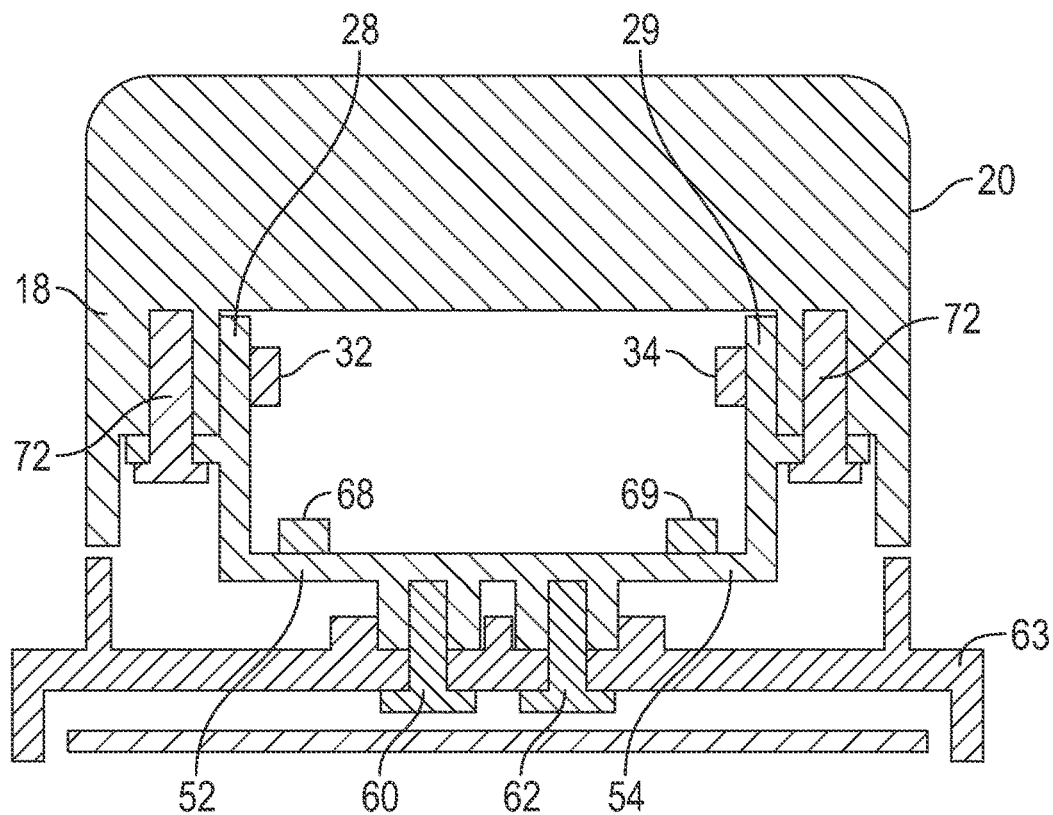
FIG. 4 is a cross-sectional view of the controller as viewed in the Y-Z plane indicated in FIG. 2.
Figure 5:
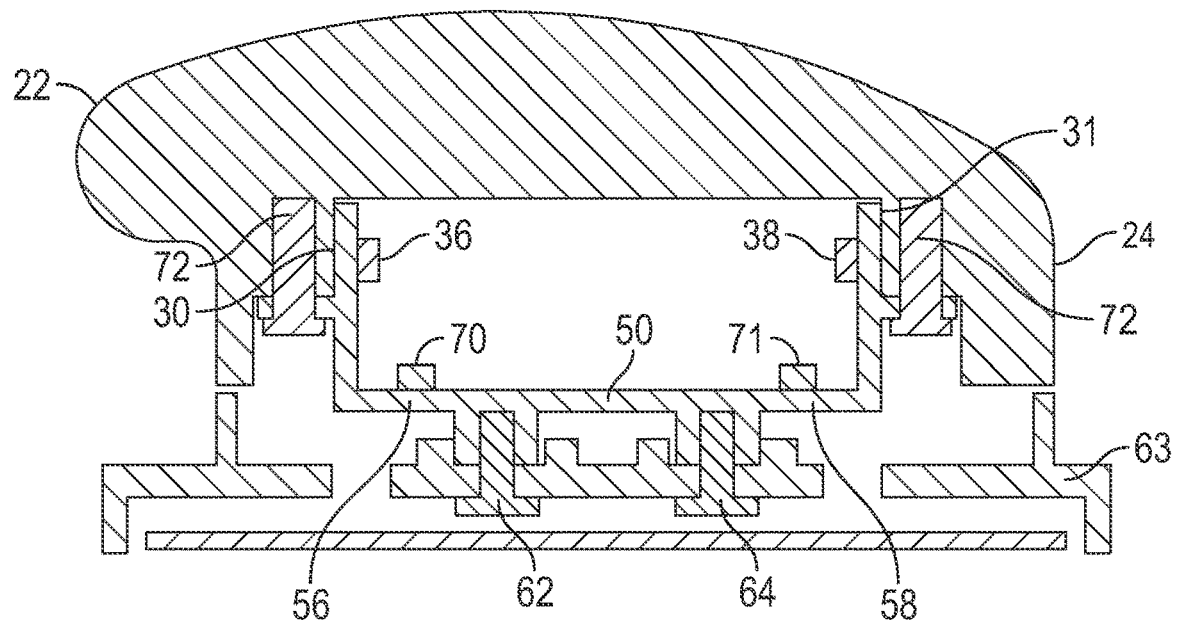
FIG. 5 is a cross-sectional view of the controller as viewed in the Y-Z plane indicted in FIG. 2.

Shaped strain plate 26 is integral with, or preferably attached to, the contoured user interface 15 such that each strain surface 28, 29, 30, 31 is disposed in relation to its corresponding touch surface 18, 20, 22, 24 so that a slight pressure applied to a side touch surface causes a mechanical strain in the corresponding strain surface. For example, as shown in the cross-sectional views of FIGS. 4 and 5, when a force is applied to touch surface 18, that force is transmitted to strain surface 28. The strain imputed on surface 28 can be detected by a strain gage 32 mounted on the side of strain plate 26 opposite strain surface 28. Similarly, a force applied to touch surface 20 can be detected by strain gage 34, a force applied to touch surface 22 can be detected by strain gage 36, and a force applied to touch surface 24 can be detected by strain gage 38.

A convenient way of attaching the straining gauges to the strain surfaces of the strain plate 26 and electrically connecting the strain gauges to a microcontroller is by mounting the strain gauges to a flexible printed circuit board 40 (e.g., folded as indicated in FIG. 3), and adhesively bonding the exposed surface of the strain gauges to a corresponding surface of the strain plate (such as with a pressure sensitive adhesive).

The use of strain gauges 32, 34, 36 and 38 on side touch surfaces 18, 20, 22 and 24, respectively, can in theory provide 15 different control signals associated with each of 15 different user gestures involving applying pressure to the touch surfaces individually or in combinations. However, as a practical matter, a driver using such haptic controller with a single hand, and without looking at the controller 10 during use, will generally be limited to comfortably and simply applying pressure to individual touch surfaces or to applying pressure on opposite surfaces 18 and 20 concurrently. In fact, it is currently believed that drivers would prefer that the gestures be limited to squeezing the controller by applying pressure to opposite sides 18 and 20, and to applying rotational torque around the indicated X-axis, Y-axis and Z-axis shown in FIG. 2. Use of the four strain gauges 32, 34, 36 and 38 associated with the side touch surfaces 18, 20, 22 and 24 are only capable of detecting a rotational torque applied around the Z-axis (i.e., the vertical axis extending perpendicular to top touch surface 16). In this case, either a clockwise or counterclockwise torque applied around the Z-axis should produce a strain detected by each of strain gauges 32, 34, 36 and 38.

Figure 6:
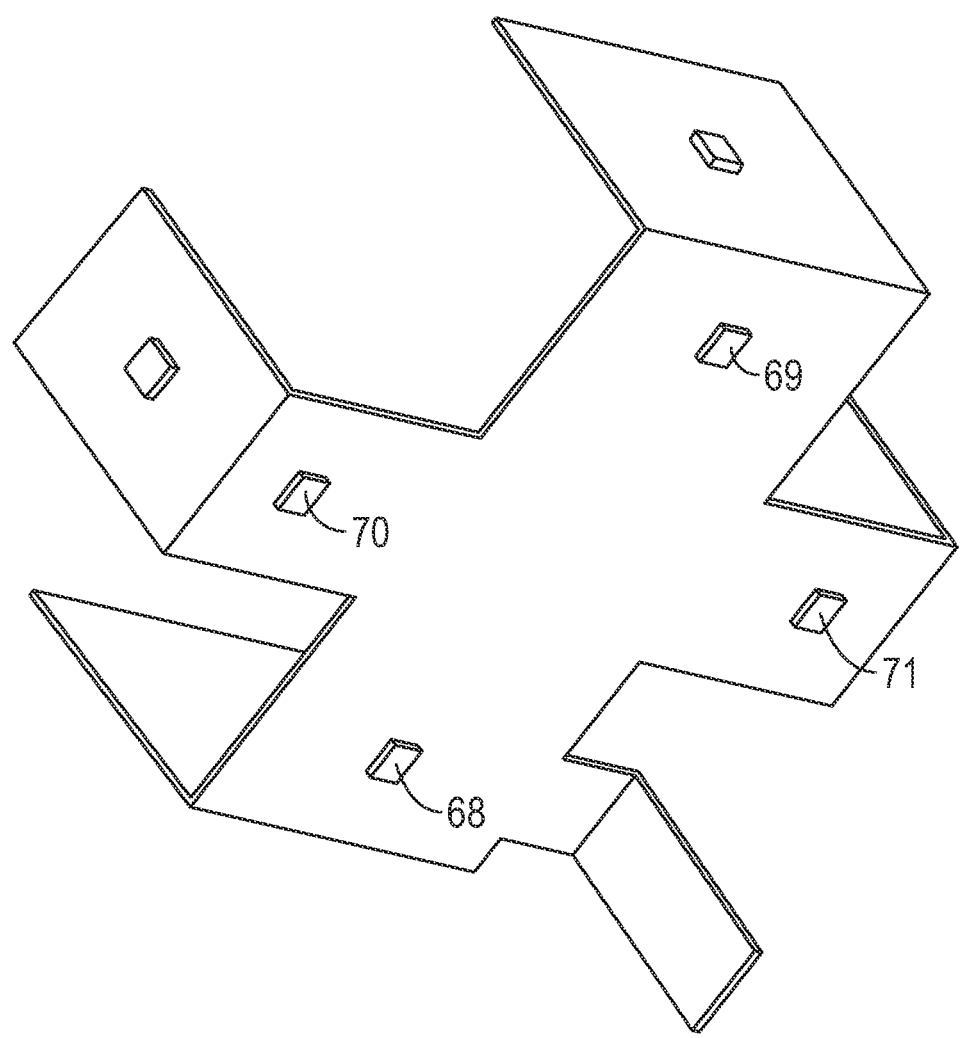
FIG. 6 is a perspective view of the underside of the flexible mounted circuit board shown in FIG. 3.

In order to detect rotational torque applied around the X-axis and for Y-axis, strain plate 26 is provided with a corresponding top strain surface 50 disposed in relation to the top touch surface 16 so that pressure applied to the top touch surfaces causes strain in the top strain surface which can be detected by a strain gage attached to the strain plate. Strain surface 50 can be provided with a single strain gage if it is only designed to detect a downward force applied to top touch surface 16. However, to detect torque applied around the X-axis and Y-axis, top strain surface 50 can be divided into mechanically isolated sections 52 and 54, which are located along the Y-axis adjacent the walls of the user interface 15 defining touch surfaces 18 and 20, respectively; and mechanically isolated sections 56 and 58 located along the X-axis adjacent the walls of user interface 15 defining touch surfaces 22 and 24. The mechanically isolated sections of top strain surface 50 are sufficiently distanced apart so that strain concentrated on one section can be distinguished from strain concentrated on another section. Strain gauges 68, 69, 70 and 71 are attached to sections 52, 54, 56 and 58, respectively. FIG. 6 shows the location of strain gauges 68, 69, 70 and 71 on flexible printed circuit board 40 prior to assembly of controller 10.

Figure 7:
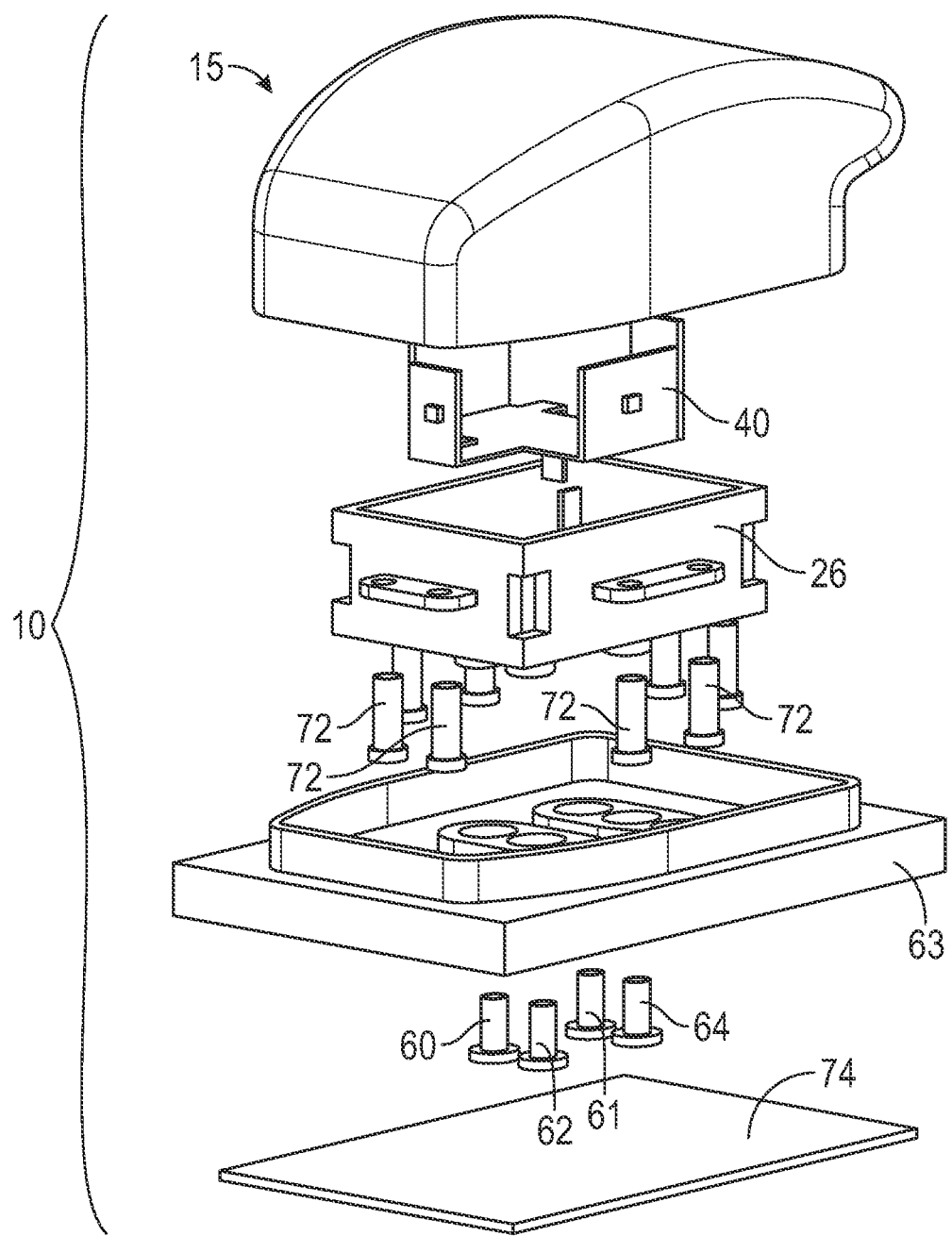
FIG. 7 is an expanded diagram of the controller showing how the various components are assembled.

FIG. 7 is an assembly diagram showing the arrangement of components of haptic controller 10.

Fasteners 72 can be used to attach user interface 15 to strain plate 26, and fasteners 60, 62 and 64 can be used to attach strain plate 26 to base 63.

A printed circuit board 74 having a microcontroller and associated electronics for detecting and analyzing data from the strain gauges and generating an appropriate control signal can be located under the base 63.

In the illustrated embodiment, user interface 15 is provided with a front lip 80 that protrudes outwardly from front touch surface 22, and lateral lips 82, 83 that protrude outwardly from opposite side touch surfaces 18 and 20. A user can easily apply torque around the Y-axis by gently lifting upwardly on a bottom of lip 80 or apply torque in a counter-direction around the Y-axis by gently pressing downwardly at a top of lip 80. Similarly, by gently lifting upwardly on a bottom of lip 82, torque can be applied around the X-axis in one direction, or by gently lifting upwardly on a bottom of lip 83, torque can be applied around the X-axis in a counter-direction.

The controller 10 can be configured with strain gage detection thresholds and positioning set so that rotational torques around three mutually distinguishable axes can be distinguished, and so that squeezing along the Y-axis can be distinguished from rotational torque, providing four user gestures that are easily performed by the user and recognized by the microcontroller. For example, detection thresholds can be easily set so that rotational torque around the Z-axis causes strain gauges 32, 34, 36 and 38 to register a strain exceeding preselected thresholds, while strain gauges 68, 69, 70 and 71 do not. The various detected gestures can be assigned to specific vehicle operations, such as to control windows, mirror positions, sunroof, and heated/ventilated seats. A mode selection feature could be provided to allow controller 10 to be used to perform various operations within a category (e.g., window operation) using a small set of gestures. The selection could be made on vehicle display 14 or controller 10 (e.g., a fist gesture used to select mode, and a second gesture to select the specific operation (e.g., lower driver window).

The above description is intended to be illustrative, not restrictive. The scope of the invention should be determined with reference to the appended claims along with the full scope of equivalents. It is anticipated and intended that future developments will occur in the art, and that the disclosed devices, kits and methods will be incorporated into such future embodiments. Thus, the invention is capable of modification and variation and is limited only by the following claims.

The invention claimed is:

1. A touch controller, comprising:
   a contoured user interface having a top touch surface, at least two pairs of generally parallel opposing side touch surfaces, each pair of generally parallel opposing side touch surfaces being arranged at a positive angle with respect to every other pair of generally parallel opposing side touch surfaces;
   a shaped strain plate having at least two pairs of generally parallel opposing strain surfaces, each pair of generally parallel opposing strain surfaces arranged at a positive angle relative to every other pair of generally parallel opposing strain surfaces, each strain surface corresponding with a side touch surface of the contoured user interface, the shaped strain plate being integral with or attached to the contoured user interface, each of the strain surfaces disposed in relation to the corresponding side touch surface so that pressure applied to a side touch surface causes strain in the corresponding strain surface;
   a strain gauge mounted on each of the strain surfaces; and
   a printed circuit board having electronics electrically connected with the strain gauges for detecting and analyzing data from the strain gauges.

2. A touch controller, comprising:
   a contoured user interface having a top touch surface, at least two pairs of generally parallel opposing side touch surfaces, each pair of generally parallel opposing side touch surfaces being arranged at a positive angle with respect to every other pair of generally parallel opposing side touch surfaces;

a shaped strain plate having plurality of strain surfaces, each strain surface corresponding with a side touch surface of the contoured user interface, the shaped strain plate being integral with or attached to the contoured user interface, each of the plurality of strain surfaces disposed in relation to the corresponding side touch surface so that pressure applied to a side touch surface causes strain in the corresponding strain surface;

a strain gauge mounted on each of the plurality of strain surfaces; and a printed circuit board having electronics electrically connected with the strain gauges for detecting and analyzing data from the strain gauges, wherein the shaped strain plate further comprises a top strain surface corresponding with the top touch surface of the contoured user interface, the top strain surface disposed in relation to the top touch surface of the contoured user interface so that pressure applied to the top touch surface causes strain in the top strain surface, and further comprising a strain gauge mounted on the top strain surface and electronically connected to a microcontroller.

3. The touch controller of claim 2, wherein the top strain surface is mounted to a base such that at least one section of the top strain surface is mechanically isolated from at least one other section of the top strain surface, and a strain gauge is mounted on each of a plurality of mechanically isolated sections of the top strain surface.

4. The touch controller of claim 3, wherein the contoured user interface has two pairs of generally parallel side touch surfaces, each pair of generally parallel side touch surfaces arranged generally perpendicular to the other.

5. The touch controller of claim 4, wherein the top strain surface includes four mechanically isolated sections and a strain gauge mounted on each of the four mechanically isolated sections of the top strain surface.

6. The touch controller of claim 5, wherein the contoured user interface includes a lip that protrudes outwardly from at least one of the generally parallel opposing side touch surfaces to facilitate applications of rotational forces on the contoured user interface around an axis generally parallel with the lip.

* * * * *